United States Patent [19]

Barnes

[11] Patent Number: 4,961,334
[45] Date of Patent: Oct. 9, 1990

[54] MODULAR EDGE CONDITIONER

[76] Inventor: Austen Barnes, 2250 Midland Ave. Unit 24, Scarborough, Ontario, Canada, M1P 4R9

[21] Appl. No.: 825,668

[22] Filed: Feb. 3, 1986

[51] Int. Cl.$^5$ .............................................. B21F 11/00
[52] U.S. Cl. ........................................ 72/129; 72/203
[58] Field of Search ................... 72/129, 130, 203, 40, 72/199, 366; 82/4 C; 409/297, 298, 303

[56] References Cited

U.S. PATENT DOCUMENTS

| | | | |
|---|---|---|---|
| 668,330 | 2/1901 | Hancox | 72/203 |
| 1,070,282 | 8/1913 | Norton et al. | 409/298 X |
| 2,984,285 | 5/1961 | Simich et al. | 72/366 X |
| 3,254,568 | 6/1966 | Pickard | 409/303 |
| 3,387,479 | 6/1968 | Winkler | 72/203 X |
| 3,768,293 | 10/1973 | Ruesch | 72/203 |

Primary Examiner—E. Michael Combs

[57] ABSTRACT

Treatment means for metal strip edges provide opposed carriages designed to simultaneously treat opposite edges with treatment tools. Rollers on the carriage are located to contact the edges of the strip on the same side as that carriages edge treatment tool and allow accurate positioning of the tools relative to the strip edges.

9 Claims, 5 Drawing Sheets

MODULAR EDGE CONDITIONER

This invention relates to edge treatment tools for metal strip.

In the production of metal strip for stampings or other uses the strip is frequently cut or subject to a slitting operation to form a number of narrow strips out of a wide strip. Strips formed in such ways and strips otherwise formed frequently have burrs or other edge defects generally due to the method of forming the strip.

It is an object of this invention to provide an edge treatment tool for metal strips which will scarf, swage or roll the edges of such strip while it is travelling.

It is an object of this invention to provide an edge treatment tool for travelling metal strips adaptable to scarf, swage, roll or correct the camber of the strip.

To "scarf" the edge is to cut the edge of the travelling strip to remove unwanted edge material.

To "swage" the edge is to press upon the edge of the travelling strip to reform it.

To "roll" the edge, is to deform it by pressure using a rolling action.

To treat the "camber" is to correct a tendency of the strip to curve in a direction transverse to its longitudinal, travel direction, and in the plane of the strip.

It is an object of the invention to provide an edge treatment tool for travelling metal strip wherein a carriage is movable in the plane of the strip and transversely of the strip travel direction and mounts a pair of rollers, spaced from each other in the strip travel direction which are designed to contact the edge of the strip and define the relative spatial position of the strip edge and the rollers. A slide is mounted on the carriage adjustable to move relatively to the carriage in the plane of the strip and transversely to the strip travel direction. The slide mounts a tool for scarfing or swaging the strip edge and due to its association with the datum relationship provided by the carriage rollers on the strip edge can be accurately adjusted for the scarfing or swaging operation required.

It is an object of the invention to provide an assembly comprising two carriages, operable as described in the previous paragraph, mounting edge treatment tools, as described and directed toward contacting the opposite edges of the travelling strip.

It is an object of the invention to provide an assembly as described in the previous paragraph where the assembly includes a frame, and the frame provides a pair of rods extending transversely of the strip on which both carriages are mounted. Each rod is rotatable and has a threaded connection to one carriage and a sliding connection to the other carriage. Thus each carriage is controllable in transverse location by rotating the relevant rod and the assembly as a whole is a compact and efficient means for edge treatment of both edges of a strip.

It is an object of the invention as described in the previous paragraph to provide carriages with alternate roller locations to those described above. This allows the rollers of the two carriages to be located opposite one another to roll the strip edges. In an alternative roller arrangement the rollers of the two carriages on the strip may be arranged, where the strip has an unwanted camber, to have a pair of rollers on the concave strip edge located upstream and downstream of a roller on the convex strip edge whereby the opposed rollers may be caused to exert the pressure to correct the camber.

Figure 1:
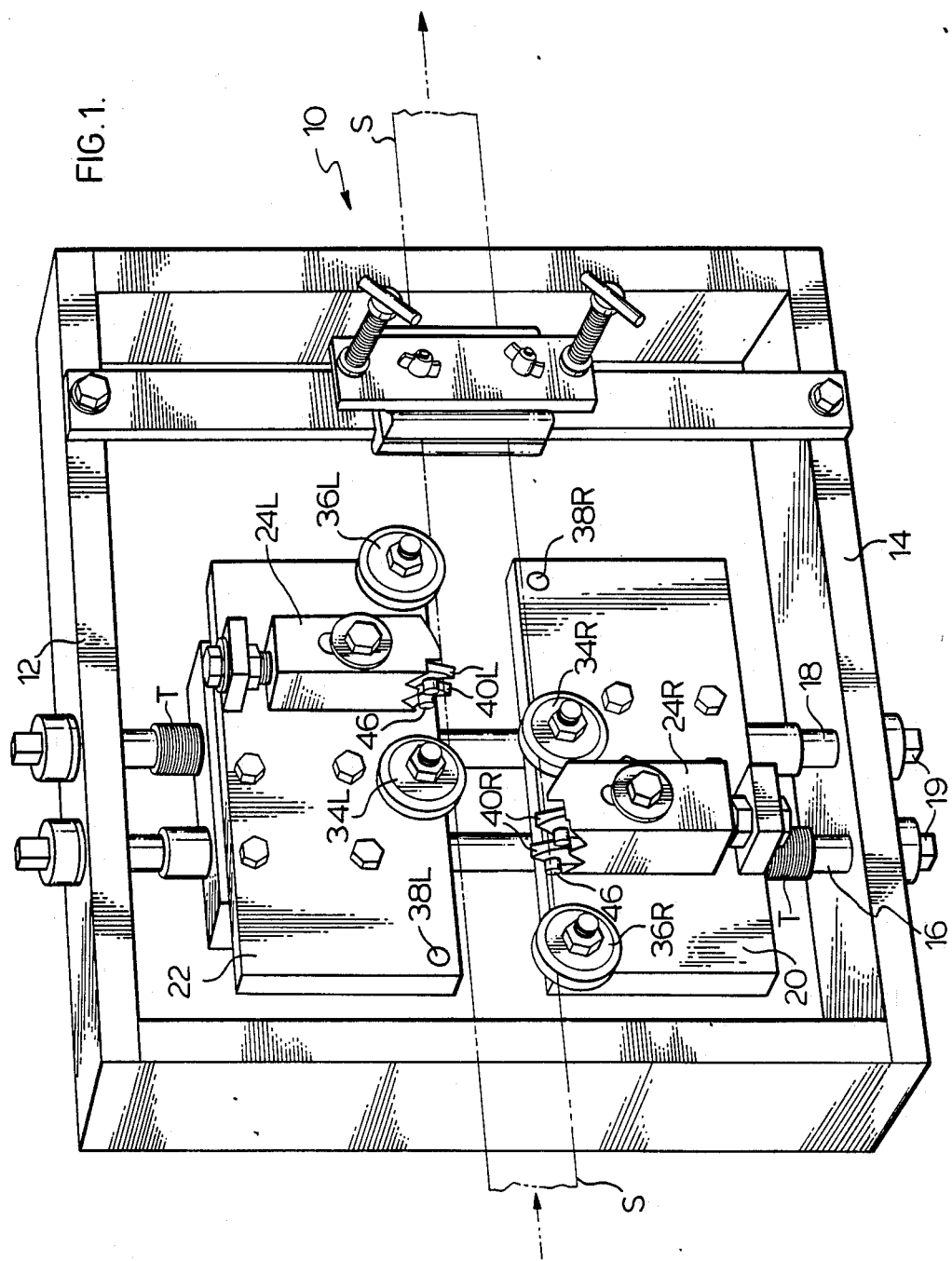
FIG. 1 is a perspective of an assembly in accord with the invention.
Figure 4A:
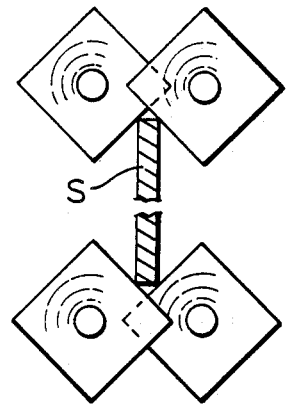
Figure 4:
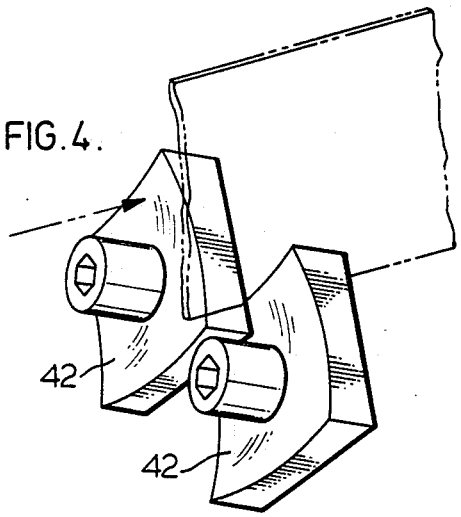
Figure 5:
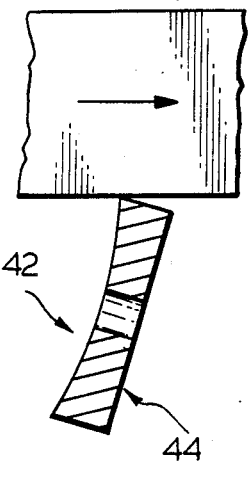
Figure 7:
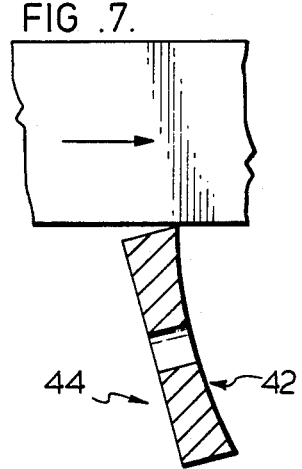
Figure 6:
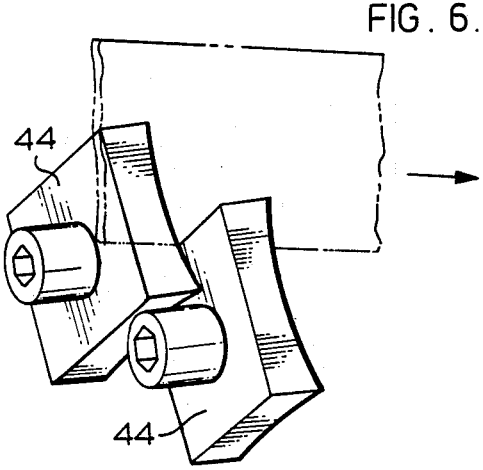
Figure 8:
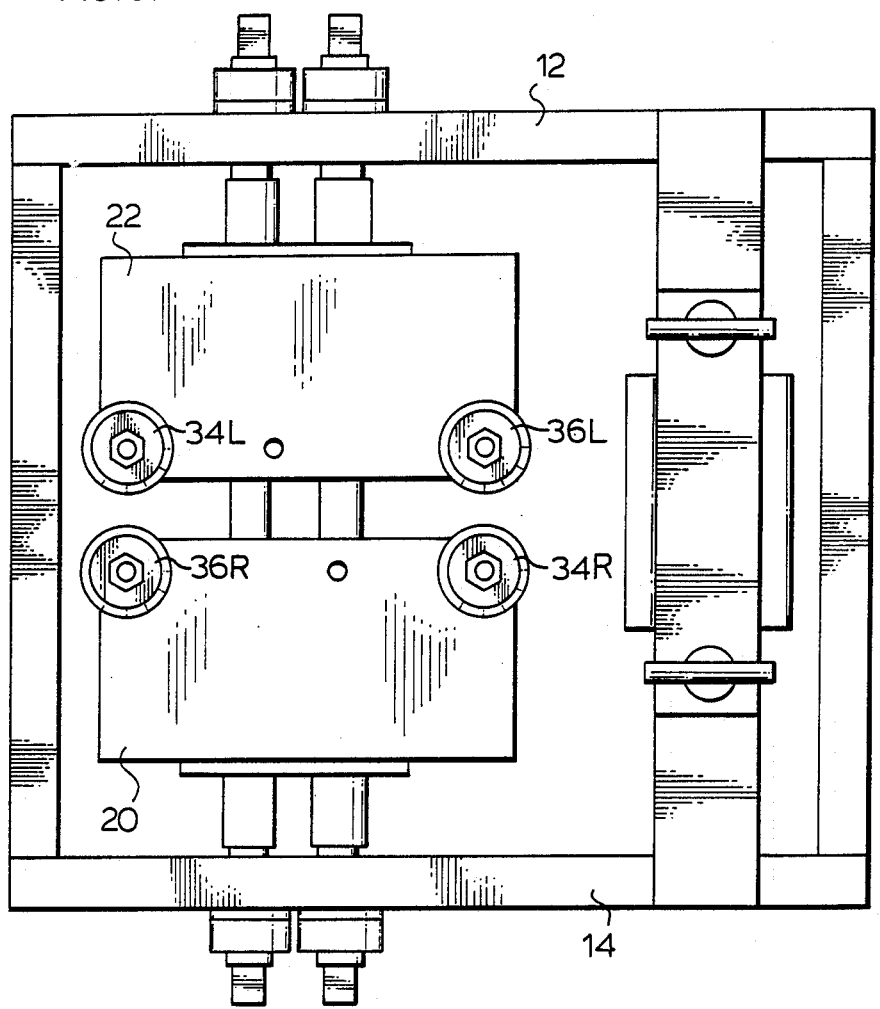
Figure 9:
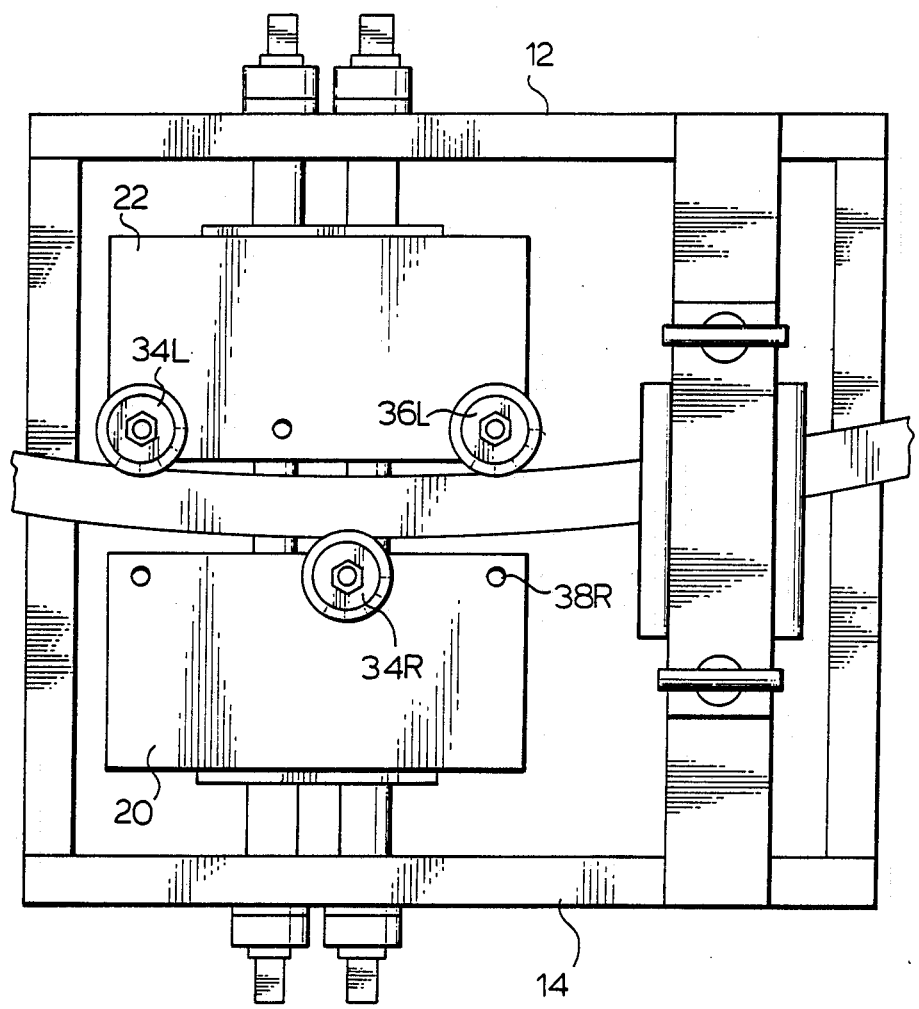

FIG. 4 is an enlarged perspective showing the tools scarfing action in the arrangement of FIG. 1, FIG. 4A is a view showing the relative positions of tools and strip edges looking downstream, FIG. 5 is a sectional view showing the tool scarfing action in the arrangement of FIGS. 1 and 4, FIG. 6 is an enlarged perspective showing the tools rearranged to swage instead of scarf, FIG. 7 is a sectional view showing the tool swaging action in the arrangement of FIG. 6, FIG. 8 is a schematic view showing the arrangement of the rolls for rolling, FIG. 9 is a schematic view showing the arrangement of the rolls for camber correction.

In the drawings a frame 10 is constructed to provide a pair of mounting bars 12 and 14 parallel to and on opposite sides of the strip travel locus defined by dotted lines S—S with the arrow indicating the strip travel direction. In the upstream portion of the frame a pair of rods 16 and 18 extend between the mounting bars 12 and 14 on which they are rotatably mounted. Each rod is provided with a square end 19 for rotation by an adjustment tool not shown. Carriage platforms 20 and 22 are provided, each mounted on the two rods and located on opposite sides of the strip travel locus. The carriage mounting is such that carriage platform 20 is threadedly coupled to rod 16 by the threading T on its right hand end and complementary threading not shown on the carriage, and slidably mounted on rod 18. While carriage platform 22 is slidably mounted on rod 16 and threadedly on rod 18 with threading T on its left hand end connecting to complementary threading not shown on the carriage 22. Thus rotation of rod 16 controls the transverse location of platform 20 and rotation of rod 18 controls the transverse location of platform 22 while a compact assembly is provided for both carriages, their control and use as hereinafter described.

'Left' and 'right' hand herein are relative to the travel direction shown by the arrows.

Each carriage slidably mounts a tool holder slide 24 slidable transversely relative to the strip travel direction and relative to the carriage. The slide 24L is toward the downstream extent of carriage 22 and is controllable by rotation of a threaded bolt 28L., as control nut 30L is fixed on the other end of bolt 28L for rotating it and a lock nut 32L is loosened to allow rotation of the bolt and tightened to fix the bolt in position. The slide 24R is located toward the upstream extent of carriage 20 and control nut 30R adjust the position of slide 24R as did the similar members on carriage 22. The two tools 40 mounted on each slide will be hereinafter described. The carriages 20 and 22 and tools have identical members although the rollers and slides are staggered in the strip travel direction. It will be convenient to refer to the roller and tools of left hand carriage 20 with an 'L' suffix and those of carriage 22 with an 'R' suffix.

Rollers 34L and 36L straddle the tools 40L in the strip travel direction. It will be noted that carriage 20 is identical to carriage 20 but carries slide 24R on its upstream extent. The rollers 34R and 36R again straddle the tools 44R in the strip travel direction. It will also be noted that opposite rollers 36R near the upstream end of carriage 20 is a roller mount aperture 38L. Opposite roller 36L near the downstream end of carriage 20 is a roller mount aperture 38R.

With the rollers 34L,36L,34R,36R, as shown located for the scarfing or swaging operation, their disposition in the strip travel direction is as follows: roller 36R, cutting tools 40R, roller 34L, roller 34R cutting tools 40L, roller 36L. Thus each pair of tools may be accurately positioned after the rollers of its own carriage have been brought into contact with the strip edge to define accurately the carriage position relative to the strip. Moreover it will be noted that rollers 34L and 34R are staggered relative to each other in the strip travel direction which allows the carriages to be brought closer to each other than opposed rollers would permit for dealing with thin strips. Further locating roller 34L upstream of roller 34R provides that each of such rollers is relatively closely located in the strip travel direction, to the location of the respective tool pair 40R or 40L, on the opposite carriage to support the strip near the opposed application of tool pressure. The function of the unused roller holes 38L,38R will be discussed hereafter.

Figure 3:
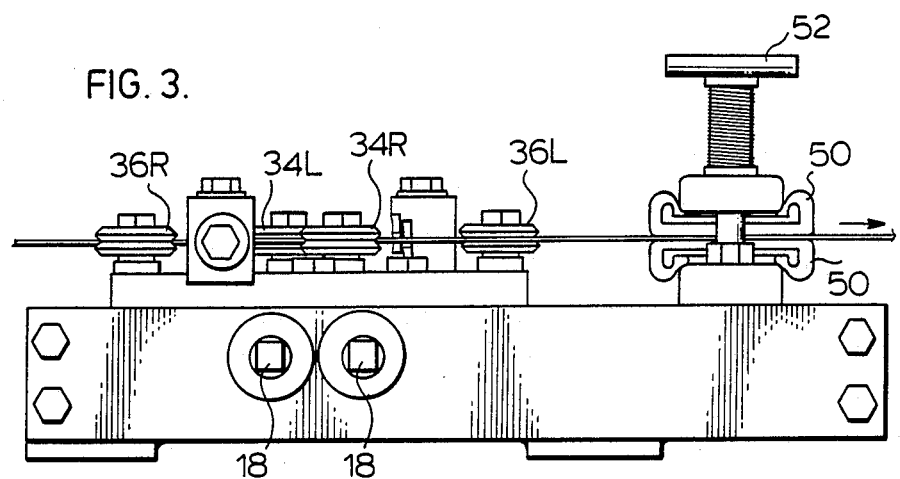
FIG. 3 is a side view of the assembly of FIG. 1.

The rollers 34 or 36 as shown in FIG. 3, have a V groove with about a 90° included angle, designed to contact the strip edge corners and accurately define the relative positions of strip and carriage.

The tools may, within the scope of the invention, be of any desired form, suitable for the scarfing or swaging operation. However, I prefer to use the tool arrangement shown best in FIG. 4 and to be described. Each slide tool 40 preferably is designed for use on a lathe. Each lathe tool 40 is square in plan with rectilinear edges and usually made of very hard carbide steel. One square side 42 is concave with outwardly projecting corners and the opposite side 44 is flat. It will be noted that midway along each concave side the section of the tool gives an acute cutting or scarfing edge, best shown in FIG. 5. Thus although such tools are designed for use on a lathe where the cutting is performed by one of the corners of the square, this invention uses the mid sides of the concave side as the scarfing cutting implement. As best shown in FIG. 1 the tool pairs on each side mounted in a holder shaped so that the tools are rigidly held in place by the holder shaping and a bolt 40, that is against rotation or translation relative to the holder. The tools are oriented with a corner projecting transversely and parallel to the plane of the strip and displaced vertically from each other so that the lower edge-adjacent side of the upper tool and the upper inward side of the lower tool form a edge facing V wherein the tool sides referred to cut the strip on the upper and lower edges as best shown in the enlarged FIG. 4A. The tools are then oriented about a vertical axis so that the edge-adjacent side of each tool is slightly downstream from the edge remote side to provide a suitable angle of scarfing or cutting. The angle of scarfing or cutting is best shown in FIG. 5.

If swaging instead of cutting is desired the tools may be interchanged, or each tool rotated 180° about a transverse axis in the strip plane (not shown). FIG. 6 shows the respective disposition of the tools after interchange. The tools then again contact the strip edges along the same locations on their square sides with the edge-remote side of the tool downsteam of the edge adjacent side as best shown in FIG. 7, and the angle of the tools is such that the forward portion of each tool edge is spaced from the strip which therefore contacts the strip at the trailing edge of the square side as best shown in FIG. 7.

Figure 2:
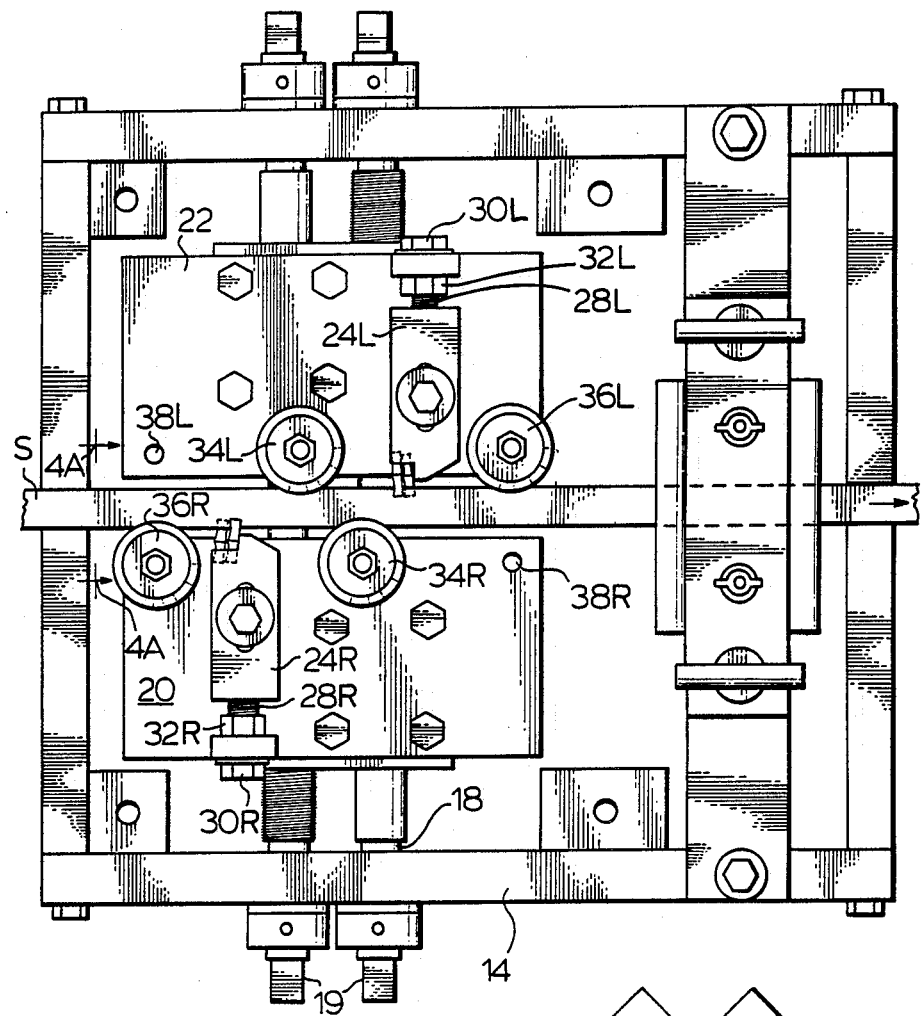
FIG. 2 is a plan view of the assembly of FIG. 1.

For either cutting or swaging, the tools are oriented for the operation desired and the control of rod 16 or 18 for the respective carriages operated until the rollers 34-36 are in firm contact with the strip. With lock nut 32 loosened, the nut 30 for each tool is then adjusted until the desired cutting negative clearance or swaging pressure is obtained. Lock nut 32 is again tightened. One aspect of the cutting operation is of interest. As will be noted from FIGS. 2,1, and viewed in plan one of the two cutting tools of a pair can be considered as upstream of the other. It is found that the upstream tool has a better cutting action than the other. Thus if it is known that the strip will have larger burrs or materials on one side than the other, the tools are arranged so that the upstream cutting tool contacts the poorer strip edge.

As shown in FIG. 3 a pair of wiping pads 50 with an adjustable pressure control 52 are provided downstream from the cutting tool to firmly wipe both sides of the strip and remove cuttings, or other metal fragments.

FIGS. 8 and 9 show other operations which may be performed by the assembly. For rolling treatment of the edges, FIG. 8 as shown schematically the tool hoders have been retracted or removed and the rollers 34L and 34R relocated in respective apertures 38L and 38R at the corners of their respective carriages. Thus roller 38L is directly opposite roller 36R and roller 38R is directly opposite roller 36L. Thus both carriages may be moved directly inward to apply the desired rolling pressure to the opposed edges of the strip.

To correct camber the rollers are arranged as shown in FIG. 9 again with the tools retracted or removed. The unwanted strip camber will provide a concave and a convex edge. Such unwanted camber has been exaggerated in FIG. 9 where the upper side is shown as concave. As shown a single roller 34R in its regular location on the convex edge is straddled by upstream and downstream rollers 34L and 36L on the concave edge. The roller 34L is relocated in the corner location in aperture 38L. Applying the requested amount of pressure will correct the degree of camber.

In all applications, where there is a tendency either because of the inventive assembly or otherwise of the strip to buckle upwardly or downwardly, hold down rollers (not shown) may be provided, in accord with techniques well known to those skilled in the art.

I claim:

1. Treatment means for metal strip edges wherein there is a strip travel direction,
    a base, opposed carriages each slidably mounted on said base to be movable thereon transversely to the strip travel direction and located on opposite sides of the strip locus,
    each carriage mounting a pair of rollers spaced in the strip travel direction,
    said rollers being rotatable about axes perpendicular to the plane of the strip and being located to engage the same strip edge with the rollers edges shaped to position the strip,
    edge treatment means mounted on each carriage designed to engage the edge of the strip intermediate, in the strip travel direction, the pair of rollers mounted on that carriage,
    means on each carriage for adjustment of the edge treatment means, relative to the carriage on which it is mounted, in a direction transverse to the strip travel direction, wherein said rollers and treatment means are arranged in the strip travel direction from upstream to downstream as follows : first carriage rollers, first carriage treatment means, second carriage roller, first carriage roller, second carriage treatment means, second carriage roller.

2. Treatment means as claimed in claim 1 wherein said edge treatment means consists of a pair of square lathe tools designed for cutting at a corner of the square but arranged, respectively, to contact the strip on its upper and lower edges along the side of the tool square at a location spaced from said corner, the edge contacting sides of the two square lathe tools defining between them, when viewed in the strip travel direction, a V open toward the strip edge.

3. Treatment means as claimed in claim 1 wherein a frame is provided, forming part of said base, and having sides located on opposite sides of said carriages transversely disposed therefrom relative to the strip travel direction, a pair of parallel rods extending across said frame between said sides and rotatably mounted thereon, one of said rods having a threaded connection to one carriage and a slidable connection to the other and the other having a slidable connection to said one carriage and a threaded connection to said other carriage.

4. Treatment means as claimed in claim 3 wherein said edge treatment means consists of a pair of square lathe tools designed for cutting at a corner of the square but arranged, respectively, to contact the strip on its upper and lower edges along the side of the tool square at a location spaced from said corner, the edge contacting sides of the two square defining between them, when viewed in the strip travel direction, a V open toward the strip edge.

5. Treatment means for metal strip edges wherein there is a strip travel direction, a base, opposed carriages each slidably mounted on said base to be movable thereon transversely to the strip travel direction and located on opposite sides of the strip locus, each carriage mounting a pair of rollers spaced in the strip travel direction, said rollers being rotatable about axes perpendicular to the plane of the strip and being located to engage the same strip edge with the rollers edges shaped to position the strip, edge treatment means mounted on each carriage designed to engage the edge of the strip intermediate, in the strip travel direction, the pair of rollers mounted on that carriage, means on each carriage for adjustment of the edge treatment means, relative to the carriage on which it is mounted, in a direction transverse to the strip travel direction, wherein said edge treatment means consists of a pair of square lathe tools designed for cutting at a corner of the square but arranged, respectively, to contact the strip on its upper and lower edges along the side of the tool square at a location spaced from said corner, the edge contacting sides of the two square lathe tools defining between them, when viewed in the strip travel direction, a V open toward the strip edge.

6. Treatment means as claimed in claim 5 where said square stools have a concave outward shape on one side of the square and a flat shape on the other side of the square and both tools on a slide treatment means are mounted with the concavities facing in the same direction.

7. Treatment means as claimed in claim 6 where said tools are oriented on said slide so that with said concave sides facing in the upstream direction the edge contacting sides of said tools are trailing the opposite sides of said squares relative to the strip travel direction.

8. Treatment means for metal strip edges wherein there is a strip travel direction, a base, opposed carriages each slidably mounted on said base to be movable thereon transversely to the strip travel direction and located on opposite sides of the strip locus, each carriage mounting a pair of rollers spaced in the strip travel direction, said rollers being rotatable about axes perpendicular to the plane of the strip and being located to engage the same strip edge with the rollers edges shaped to position the strip, edge treatment means mounted on each carriage designed to engage the edge of the strip intermediate, in the strip travel direction, the pair of rollers mounted on that carriage, means on each carriage for adjustment of the edge treatment means, relative to the carriage on which it is mounted, in a direction transverse to the strip travel direction, wherein a frame is provided, forming part of said base, and having sides located on opposite sides of said carriages transversely disposed therefrom relative to the strip travel direction, a pair of parallel rods extending across said frame between said sides and rotatably mounted thereon, one of said rods having a threaded connection to one carriage and a slidable connection to the other and the other having a slidable connection to said one carriage and a threaded connection to said other carriage.

9. Treatment means as claimed in claim 8 wherein said edge treatment means consists of a pair of square lathe tools designed for cutting at a corner of the square but arranged, respectively, to contact the strip on its upper and lower edges along the side of the tool square at a location spaced from said corner, the edge contacting sides of the two squares defining between them, when viewed in the strip travel direction, a V open toward the strip edge.

* * * * *